April 5, 1932.                G. RAYMOND ET AL                1,852,371
                              FILTERING APPARATUS
                              Filed Jan. 21, 1929            2 Sheets-Sheet 1
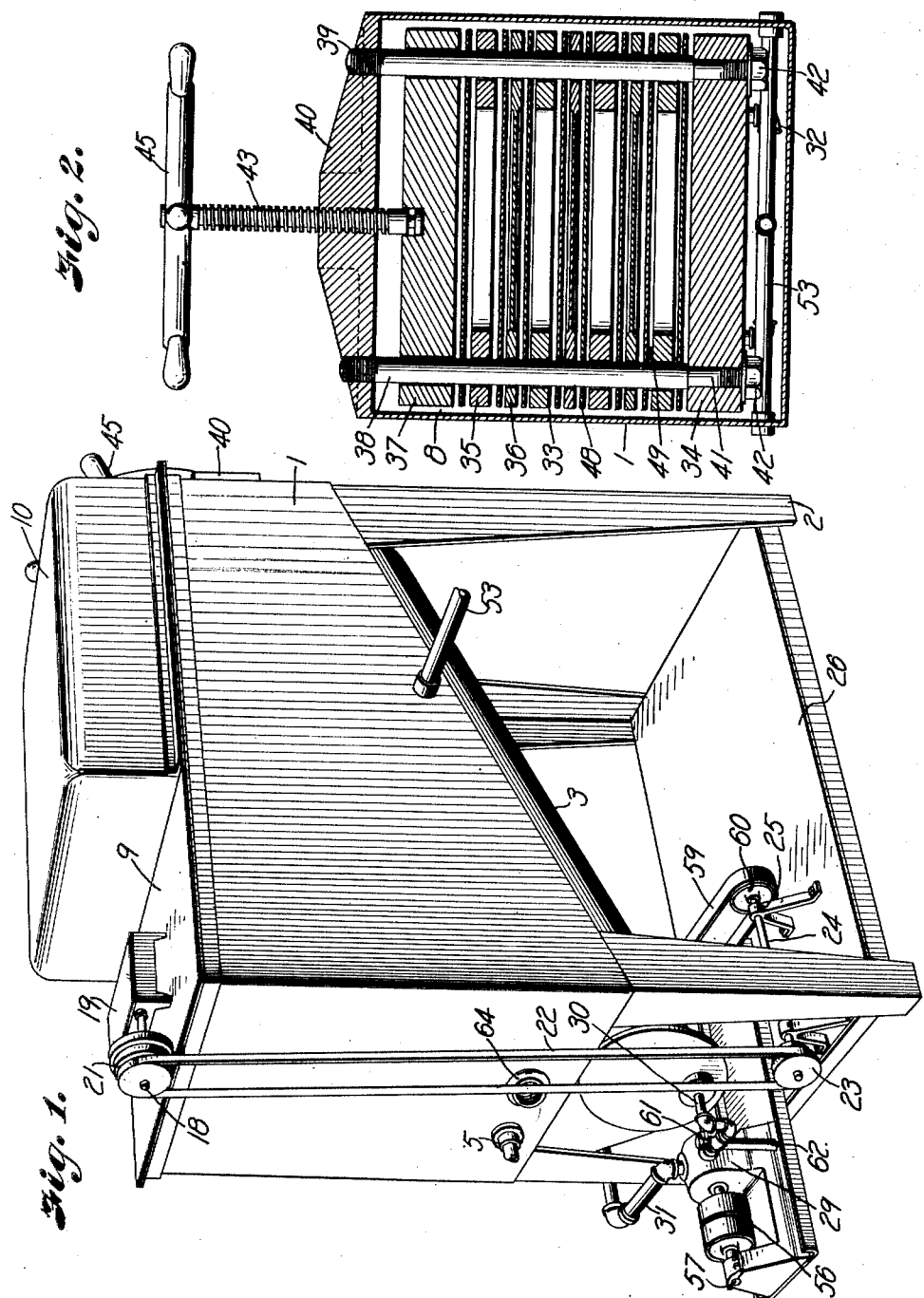
INVENTOR
Gwynne Raymond
and Ralph A. Morgen.
BY
ATTORNEY

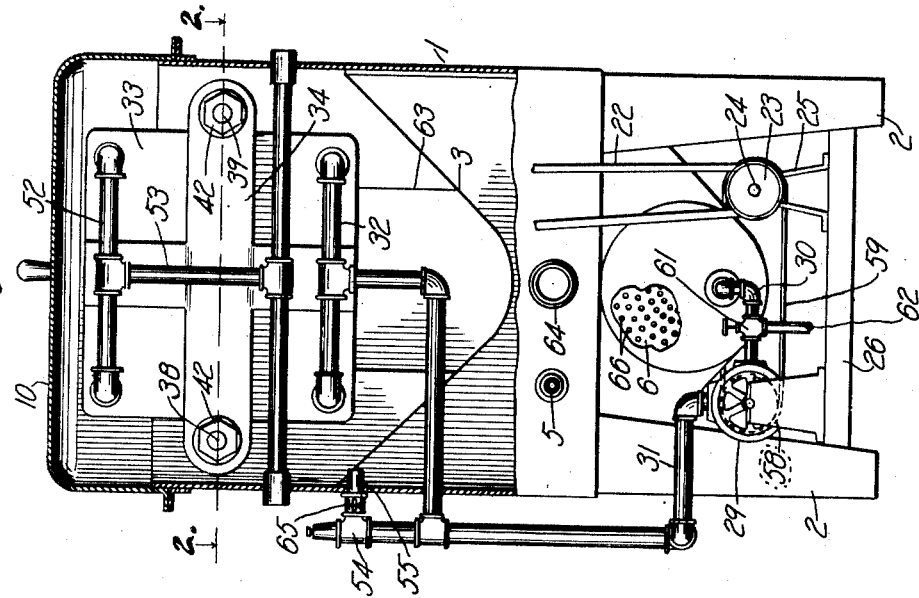

Patented Apr. 5, 1932

1,852,371

UNITED STATES PATENT OFFICE

GWYNNE RAYMOND AND RALPH A. MORGEN, OF KANSAS CITY, MISSOURI

FILTERING APPARATUS

Application filed January 21, 1929. Serial No. 333,892.

Our invention relates to filters and more particularly to apparatus of that character for filtering cleaner's solvents and other fluids. The principal objects of the invention are to simplify installation and operation of the apparatus, to prevent loss of fluid when the apparatus is being cleaned of spent filtering material and to provide a reservoir for ballast storage of proportions of the fluid being worked with.

In accomplishing these and other objects of the invention, we have provided improved details of structure, the preferred forms of which are illustrated in the accompanying drawings, wherein:

Fig. 1 is a perspective view of a filtering apparatus constructed in accordance with our invention.

Fig. 2 is a horizontal section on the line 2—2, Fig. 4.

Fig. 3 is a longitudinal vertical section through the apparatus particularly illustrating the arrangement of the liquid receiving reservoir, filter and chemical feeding mechanism.

Fig. 4 is a vertical cross-section on the line 4—4, Fig. 3.

Referring in detail to the drawings:

1 designates a rectangular sheet metal casing adapted for support on a floor by legs 2 and having a trough-shaped bottom 3, inclined downwardly toward one end of the casing, to provide a reservoir 4 for receiving and treating fluid which is fed thereinto through a pipe connection 5.

Extending across the casing and the trough-shaped bottom is a partition 6 for dividing the casing into a feeder compartment 7 and a filter compartment 8 and defining a liquid and filter aid receiving or mixing tank and a drainage basin or chamber, the feeder compartment 7 being covered by a flat top 9 and the filter compartment by a dome shaped cover 10 providing a substantially gas tight casing.

Mounted in the feeder compartment 7, directly above the mixing reservoir 4, is a tank 11 containing a powdered filter aid to be mixed with the incoming liquid in the reservoir. The tank 11 is provided with a central tubular-shaped outlet 13 in its bottom 12 through which fresh treating material is fed into the reservoir in uniform amounts by a screw conveyor 14.

The conveyor 14 is of substantially the same diameter as the tubular outlet and is fixed on the end of a vertical shaft 15 which projects through the top of the casing and is rotated by a worm 16 meshing with a worm gear 17 fixed on the end of the shaft. The worm 16 is fixed on a horizontal shaft 18 rotatably mounted in a casing 19 which encloses the gears and in a bearing 20 adjacent the side edge of the casing 1. The shaft 18 projects beyond the edge of the casing and is provided with a cone pulley 21 driven by a belt 22 from a similar pulley 23 on a counter shaft 24 mounted in bearings 25 supported on a shelf 26 supported by the legs 2.

The filter aid comprises a mixture of several ingredients and in order to thoroughly mix and agitate the materials we provide the shaft 15 with a scraper and agitating arm 27 which rotates therewith to loosen and mix the materials as they are fed by the screw into the reservoir.

The fluid after receiving the filter aid is pumped from the reservoir through a port 28 in the lower end of the trough by a pump 29 which is connected therewith by a suction line 30 and the fluid is discharged from the pump through a pipe 31 into the manifold pipe 32 of a filter 33.

The filter is of the standard plate and frame type and comprises a back plate 34, alternate frames 35 and diaphragm plates 36, and a press plate 37 supported from rods 38 and 39 carried by a cross bar 40 fixed to outside end of the housing. The back plate 34 is fixed to the reduced ends 41 of the rods by nuts 42 and the other plates 35 and 36 are slidable on the rods under influence of the press plate 37 which is moved to and from the other plates by a screw shaft 43 threadedly mounted in the bar 40 and having its inner end rotatably mounted in the press plate and its outer end projecting through an opening 44 in the casing and provided with an actuating wheel 45.

The plates and frames 35 and 36 and the fixed plate 34 are provided with spaced inlet channels 46 which communicate with the manifold pipe and with the interior of the frames through openings 47 whereby the fluid is fed between screens 48 which are clamped between the plates and frames as in standard filter practice.

The fluid passes through the screens 48 and into chambers 49 formed by recessing the plates and is discharged through ports 50 communicating the chambers 49 with channels 51 similar to the channels 46. The channels 51 communicate with a manifold pipe 52 connected with a discharge line 53 through which the clean fluid may be discharged from either side of the casing.

We also prefer to provide the line from the pump with a pressure relief valve 54 to relieve pressure in the line by by-passing the fluid through the relief valve back into the casing through a pipe 55 when the pressure becomes excessive, as in case of stoppage in the line or when the filter has completely filled with the filter cake.

The pump is preferably operated from a line shaft through loose and fixed pulleys 56 on the pump shaft 57, although the pump may be directly operated through a motor if desired. Mounted on an extension of the pump shaft is a pulley 58 for driving the counter shaft by a belt 59 running over the pulley and a similar pulley 60 on the counter shaft so that the feeder is operated when the pump operates.

We also provide the suction line with a T valve fitting 61 connected with a branch line 62 so the apparatus may be drained of fluid at night or when making repairs to the system.

The casing at the upper end of the trough is provided with a cleanout door 63 through which spent filter aid discharged from the filter is removed from the trough, and the opposite end of the casing is provided with an overflow outlet 64 below the level of the door opening to prevent fluid from flowing out the door opening when the door is removed.

In using the device assembled and constructed as described, dirty fluid is admitted into the reservoir 4 through the inlet 5 and is pumped therefrom through the suction line and discharged into the filter by the pump 29. As soon as the pump starts circulating the fluid the feeder being operated by the pump, starts feeding the powdered filter aid into the reservoir at a rate proportionate to the speed of the pump. The velocity of flow through the inlet pipe keeps the fluid in the reservoir agitated, assuring a good mix between the filter aid and the fluid.

On entering the filter the fluid passes freely through the screens but the filter aid, dirt, and other foreign matter are arrested thereby and retained in the filter frames. The clean filtered solvent then passes out through the discharge pipe and is ready for reuse.

When the filter becomes full of filter aid and dirt, or on stoppage of discharge flow, the liquid flows through the relief valve and pipe 55 back into the reservoir as is evidenced by observing the flow through a sight glass 65 in the pipe 55. The supply of fluid to the apparatus is then cut off and the pump is shut down which also stops feed of the filter aid since the feeder is driven from the pump shaft. The drain valve is then opened to drain the reservoir and the hand wheel is rotated to separate the filter plates to dump the filter aid and dirt onto the trough bottom of the casing.

The spent filter aid is prevented from sliding into the reservoir portion of the casing by the partition 6 and will spread out along the upper portion of the casing bottom in the drainage basin and allow the fluid to drain into the reservoir through perforations 66 in the partition. After allowing time for the spent filter aid to drain of the fluid, the clean out door is opened and the filter aid is scraped out by means of a hoe into a bucket or other vessel (not shown).

It is apparent that leakage from the filter will drip into the drainage basin portion of the reservoir and pass through the perforations 66 to the lower portion to be recycled through the filter, and that any leakage that may occur in the filter connections will take place within the casing and the leaks are not exposed to fire dangers.

What we claim and desire to secure by Letters Patent is:

1. In apparatus of the character described, a casing having a sloping bottom to provide a reservoir in one end of the casing, a feeder in the casing for feeding treating material into the reservoir, a filter in the casing above the reservoir, means for circulating liquid from the reservoir through the filter, means for discharging material filtered from the liquid onto the sloping bottom of the casing, means in the reservoir to receive the discharged material, and a door in the casing for removing the material filtered from the liquid.

2. In apparatus of the character described, a liquid receiver, a feeder for initially introducing treating material into the liquid, a filter for removing the treating material from the liquid, a pump for circulating fluid from the receiver through the filter, means for actuating the pump, means for actuating the feeder in direct proportion to the speed of the pump, a basin communicating with the receiver and a pressure relief valve for by-passing fluid from the pump back into said basin.

3. In apparatus of the character described, a reservoir having a sloping bottom, a transverse partition in the reservoir forming a liquid receiving compartment and a filter compartment, the reservoir having a liquid inlet into the receiving compartment, a filter above the filter compartment, means for circulating liquid from the receiving compartment through the filter, and means for discharging material filtered from the liquid onto the sloping bottom of the reservoir in said filter compartment, said partition having an opening for drainage of liquid from the filter compartment into the liquid receiving compartment.

4. In apparatus of the character described, a reservoir, a vertical partition in the reservoir forming a mixing compartment and a filter compartment and having an opening for drainage of liquid from the filter compartment to the mixing compartment, a filter above the filter compartment for discharge of material from the filter to the filter compartment, means for circulating liquid from the mixing compartment through the filter, and means for delivering treating material to the mixing compartment.

In testimony whereof we affix our signatures.

GWYNNE RAYMOND.
RALPH A. MORGEN.